(12) United States Patent
Adamski et al.

(10) Patent No.: US 12,344,208 B2
(45) Date of Patent: Jul. 1, 2025

(54) FOOT BRAKE MODULE OF AN ELECTROPNEUMATIC BRAKE SYSTEM OF A MOTOR VEHICLE

(71) Applicant: ZF CV Systems Europe BV, Brussels (BE)

(72) Inventors: Krzysztof Adamski, Wroclaw (PL); Dirk Müntefering, Wedemark (DE); Robert Otremba, Ronnenberg (DE); Karl-Heinz Riediger-Janisch, Hannover (DE); Pawel Lesik, Wroclaw (PL)

(73) Assignee: ZF CV Systems Europe BV, Brussels (BE)

( * ) Notice: Subject to any disclaimer, the term of this patent is extended or adjusted under 35 U.S.C. 154(b) by 443 days.

(21) Appl. No.: 17/772,296

(22) PCT Filed: Oct. 5, 2020

(86) PCT No.: PCT/EP2020/077817
§ 371 (c)(1),
(2) Date: Apr. 27, 2022

(87) PCT Pub. No.: WO2021/083615
PCT Pub. Date: May 6, 2021

(65) Prior Publication Data
US 2022/0379862 A1     Dec. 1, 2022

(30) Foreign Application Priority Data

Oct. 29, 2019    (DE) .................. 10 2019 129 153.4

(51) Int. Cl.
*B60T 13/68*      (2006.01)
*B60T 7/04*      (2006.01)
(Continued)

(52) U.S. Cl.
CPC ............ *B60T 13/683* (2013.01); *B60T 7/042* (2013.01); *B60T 8/327* (2013.01); *B60T 8/94* (2013.01);
(Continued)

(58) Field of Classification Search
CPC . B60T 7/042; B60T 8/327; B60T 8/94; B60T 13/683; B60T 13/662;
(Continued)

(56) References Cited

U.S. PATENT DOCUMENTS 6,354,671 B1 *   3/2002   Feldmann ............... B60T 8/327
                                                                      303/3
2002/0046616 A1     4/2002   Apel
(Continued)

FOREIGN PATENT DOCUMENTS

CN          106660534 A      5/2017
DE     102007035326 A1      1/2009
(Continued)

OTHER PUBLICATIONS

815_268 by WABCO Standard GmbH under the title: "EBS—Electronically controlled brake system in motor coaches O 580" 1998, 14 pages.
(Continued)

*Primary Examiner* — Thomas J Williams
(74) *Attorney, Agent, or Firm* — Dickinson Wright PLLC

(57) ABSTRACT

A foot brake module of an electropneumatic brake system of a motor vehicle has at least two pneumatic brake circuits. The foot brake module is operated by a brake pedal and has a pneumatic section with a pneumatic brake control valve and an electrical section with an electrical switch and at least one electronic travel sensor. The electrical switch is activated in a contactless manner. The foot brake module may have two travel sensors that each have a separate power
(Continued)

supply and are connected to different electronic control devices.

10 Claims, 3 Drawing Sheets

(51) Int. Cl.
   *B60T 8/32* (2006.01)
   *B60T 8/94* (2006.01)

(52) U.S. Cl.
   CPC ..... *B60T 2220/04* (2013.01); *B60T 2270/402* (2013.01); *B60T 2270/404* (2013.01); *B60T 2270/413* (2013.01); *B60T 2270/82* (2013.01)

(58) Field of Classification Search
   CPC .......... B60T 2220/04; B60T 2270/402; B60T 2270/404; B60T 2270/413; B60T 2270/82; B60T 17/22; G05G 1/38
   See application file for complete search history.

(56) References Cited

U.S. PATENT DOCUMENTS

| | | | | |
|---|---|---|---|---|
| 2003/0205931 A1* | 11/2003 | Muller | .................. | B60Q 1/441 303/20 |
| 2004/0187625 A1* | 9/2004 | Schiel | .................... | B60T 7/042 74/514 |
| 2011/0125381 A1* | 5/2011 | Szell | ....................... | B60T 7/042 701/70 |
| 2013/0320751 A1* | 12/2013 | Eberling | ................. | B60T 7/042 303/14 |
| 2017/0072920 A1* | 3/2017 | Besier | .................. | B60T 8/4081 |
| 2018/0001879 A1 | 1/2018 | Witte | | |
| 2022/0379862 A1* | 12/2022 | Adamski | ............... | B60T 13/662 |

FOREIGN PATENT DOCUMENTS

| | | | |
|---|---|---|---|
| DE | 102014010815 A1 | | 1/2016 |
| DE | 102014013756 B3 | | 2/2016 |
| DE | 102019104936 A1 | * | 8/2020 |

OTHER PUBLICATIONS 815 020 208.3 by WABCO Standard GmbH under the title "EBS3—Electronic brake system" Dec. 2016, 44 pages.

European Patent Office, Rijswijk, Netherlands, International Search Report of International Application No. PCT/EP2020/077817, Mailed Jan. 22, 2021, 2 pages.

* cited by examiner

FOOT BRAKE MODULE OF AN ELECTROPNEUMATIC BRAKE SYSTEM OF A MOTOR VEHICLE

CROSS-REFERENCE TO RELATED APPLICATIONS

This application is a 35 U.S.C. § 371 national phase application of International Application No.: PCT/EP2020/077817, filed Oct. 5, 2020, which claims the benefit of priority under 35 U.S.C. § 119 to German Patent Application No.: 10 2019 129 153.4, filed Oct. 29, 2019, the contents of which are incorporated herein by reference in their entirety.

FIELD

The invention relates to a foot brake module of an electropneumatic brake system of a motor vehicle having at least two pneumatic brake circuits, foot brake module can be activated by a brake pedal and has a pneumatic part having a pneumatic brake control valve and an electrical part having at least one electrical switch and at least one electronic travel sensor.

BACKGROUND

In the case of an electropneumatic brake system of a motor vehicle, the level of the brake pressures in the two brake circuits can be controlled either electronically or pneumatically. The control of the brake pressures in normal operation conventionally takes place electronically and is only switched to the pneumatic control if a fault occurs in the electronic brake control device.

In a pneumatic brake control valve, depending on the actuating travel of a plunger which is in actuating communication with the brake pedal of the motor vehicle, a brake control pressure is established from a supply pressure applied at the input side, which brake control pressure is introduced as a pilot pressure into a pneumatic relay valve of the relevant brake circuit and converted into a brake pressure which is operative in the associated wheel brake cylinders.

The aforementioned electrical switch is electromechanically operative and is in actuating communication with the plunger of the foot brake module via a cam or another component. Upon activation of the brake pedal, after overcoming an idle travel, the switch is activated whereby an initiated process is identified and, if the electrical on-board power supply is switched off or the ignition of the motor vehicle is switched off, the electronic control of the brake pressures is enabled. The actuating position of the plunger upon the activation of the switch is furthermore also used as a reference position for the aforementioned electronic travel sensor.

The electronic travel sensor is conventionally operative in a contactless manner and is inductively or magnetically influenced by a ferromagnetic or permanent-magnetic signal generator, which is fastened directly or indirectly to the plunger. The travel sensor serves as a brake value generator and measures the brake actuating travel of the plunger, which is transmitted in the form of a pulse width modulated signal to an electronic control unit of the electronic brake control device. A corresponding control current is introduced by the electronic control unit into an electromagnetic relay valve of the relevant brake circuit and converted into a brake pressure which is operative in the associated wheel brake cylinders.

Compared to a pneumatic control of the brake pressures, the electronic control of the brake pressures has the advantage of a quicker response behavior to an altered activating position of the brake pedal and more precise proportioning of the brake pressures or the operative brake forces.

The design and mode of operation of an electropneumatic brake system and a foot brake module of the WABCO 480 002 xxx 0 series are described in printed document No. 815_268 by WABCO Standard GmbH under the title: "EBS—Electronically controlled brake system in motor coaches O 580". The foot brake module described therein as a brake value generator has a pneumatic part having two pneumatic brake control valves and an electrical part having an electrical switch and two electronic travel sensors. The brake control valves and the travel sensors are each associated with a different brake circuit of the two brake circuits. The actuating travel signals of the travel sensors are relayed as pulse width modulated signals to a central module of the electronic brake control device.

The design and mode of operation of a plurality of embodiments of an electromagnetic brake system and a foot brake module of the WABCO 480 003 xxx 0 series are described in printed document No. 815 020 208.3 by WABCO Standard GmbH under the title "EBS3—Electronic brake system." The foot brake module described therein as a brake value generator has a pneumatic part having two pneumatic brake control valves and an electrical part having an electrical switch and two electronic travel sensors. The brake control valves and the travel sensors are each associated with a different brake circuit of the two brake circuits. The actuating travel signals of the travel sensors are transmitted as pulse width modulated signals to a central module of the electronic brake control device.

DE 10 2014 010 815 A1 by the applicant describes a foot brake module, described therein as an electropneumatic regulating valve, having two pneumatic brake control valves, an electrical switch, and an electronic travel sensor. The switch and the travel sensor are arranged in an electronics housing, which is fastened laterally to the housing of the foot brake module. The switch can be activated by a pressure plate via a pivotally mounted angle lever, which pressure plate is fastened to the plunger. The travel sensor is influenced by a signal generator, which is guided in a longitudinally displaceable manner between the housing of the foot brake module and the electronics housing and is fastened to the pressure plate. Evaluation electronics, in which the sensor signal of the travel sensor is converted into a pulse width modulated signal, are arranged directly adjacent to the switch and the travel sensor in the electronics housing.

Above, the travel sensors refer to so-called AMR sensors (AMR effect=anisotropic magnetoresistance effect), of which it is not the change in the field strength of a magnetic field which is detected, but the change in direction of a magnetic field, and the evaluation electronics, as in the foot brake module described above, are arranged separately in the vicinity of the sensors.

In view of the above-described embodiments of the known foot brake module, the present disclosure is based on the object of providing a foot brake module of an electropneumatic brake system of the type mentioned at the outset, which is designed to be low-wear, simple, cost-effective, and space-saving, without restricting the operational reliability of the brake system.

This object is achieved by a foot brake module having at least two pneumatic brake circuits, which foot brake module can be activated by a brake pedal and has a pneumatic part having a pneumatic brake control valve and an electrical part having at least one electrical switch and at least one electronic travel sensor, wherein the electrical switch is operative in a contactless manner and wherein each of the at least one electronic travel sensor has a separate power supply and is connected to a different electronic control unit. Advantageous developments of this foot brake module are defined further below.

The disclosure therefore relates to a foot brake module of an electropneumatic brake system of a motor vehicle having at least two pneumatic brake circuits, which foot brake module can be activated by a brake pedal and has a pneumatic part having a pneumatic brake control valve and an electrical part having at least one electrical switch and at least one electronic travel sensor.

To achieve the proposed object, it is provided in the case of this foot brake module that the electrical switch is operative in a contactless manner and that, in an embodiment of the foot brake module with two travel sensors, these each have a separate power supply and are connected to different electronic control units.

As a result of the switch being designed to be operative in a contactless manner, the switch is substantially wear-free and consequently has a long useful life. As a result of the separate power supply in each case and the connection to different electronic control units, the travel sensors can be operated independently of one another and their sensor signals can be evaluated independently of one another. This creates the advantage that the two travel sensors can be used in a mutually redundant manner so that, in the event of a failure of one of these two travel sensors, the sensor data of the other travel sensor are available to control the relay valves of one or more brake circuits of a vehicle. Moreover, owing to the separate power supply and, equipment-wise, separate evaluation of the sensor signals of the two travel sensors, it is possible to dispense with one of two brake control valves without the operational reliability of the brake system of the vehicle thereby being reduced. The use of two control units ultimately further improves the operational reliability of the brake system.

The aforementioned switch of the foot brake module is preferably operated in a magnetic-field-sensitive manner and can be designed either as a reed switch or as a Hall sensor with which a first permanent magnet, fastened directly or indirectly to a plunger which is in actuating communication with the brake pedal, is associated in each case as a signal generator. In the case of a reed switch, contact tabs made from a nickel/iron alloy are fused in a glass tube and activated by a variable magnetic field, namely they establish contact with one another or are separated from one another. A Hall sensor uses the so-called Hall effect, in which, in a conductor through which a current flows and which is located in a stationary magnetic field, the so-called Hall voltage is produced perpendicularly to the current flow and to the magnetic field direction. In the case of a variable magnetic field, the Hall voltage changes accordingly. Upon activation of the brake pedal, the variable magnetic field is produced by the magnetic field of the permanent magnet fastened to the plunger, which is conducted past the respective sensor.

It can further be provided that the aforementioned switch and the at least one travel sensor can be activated by means of only a single, common permanent magnet, which is fastened to the plunger. The manufacturing costs of the foot brake module can thus be reduced.

The at least one travel sensor is preferably also designed as a Hall sensor with which a second or common permanent magnet, fastened directly or indirectly to a plunger which is in actuating communication with the brake pedal, is associated as a signal generator.

To achieve fault-free operation and compact dimensions, it can be provided according to another development of the invention that associated evaluation electronics, in which the measured value of the respective travel sensor can be converted into a digital data transfer signal, are arranged on a sensor chip of the travel sensor. This data transfer signal can be a pulse width modulated signal, for example, although other forms of data transfer are also possible.

According to a first embodiment variant of the described inventive foot brake module, it is provided that, apart from an electrical switch, two electronic travel sensors and a pneumatic brake control valve are present therein, and that the sensor signals of the two electronic travel sensors, after their evaluation, can be used in the respectively associated control unit to control at least one pneumatic brake circuit.

In the case of the addressed evaluation of the sensor signals of the two travel sensors, it is possible that two actuating travel values are determined from these sensor signals and that the precision of the actuating travel value provided for establishing the brake pressure is improved with the use of these two actuating travel values through the calculation of an arithmetic mean value. This calculated and determined actuating travel value is then used to control the relay valves of one or more brake circuits of a vehicle.

If the two electronic travel sensors are defective or deliver implausible values, the control of one or both brake circuits of a vehicle can be switched to a pneumatic control via the single brake control valve present. In the event of a failure of the electronic controls of both brake circuits, the pneumatic control is therefore activated so that the affected vehicle can still be reliably braked via this brake circuit and its pneumatic control by the brake control valve present. Material and manufacturing costs are reduced through the omission of the previously used second pneumatic brake control valve and the dimensions of the foot brake module are reduced owing to the reduced overall height of the housing.

According to a second embodiment variant of the described inventive foot brake module, it is provided that, apart from an electrical switch, only one electronic travel sensor and only one pneumatic brake control valve are present therein, and that the sensor signals of the only one travel sensor, after their evaluation, can be used in the associated control unit to control at least one pneumatic brake circuit.

In the event of a failure of the electronic control for one or more brake circuits, the pneumatic control is enabled so that the affected vehicle can still be reliably braked by the united brake control valve present. Material and manufacturing costs can be reduced compared to known foot brake modules through the omission of a second electronic travel sensor and a second pneumatic brake control valve and the dimensions of the foot brake module can be reduced owing to the reduced overall height of the housing.

BRIEF DESCRIPTION OF THE DRAWINGS

The invention is explained in more detail below with reference to the exemplary embodiments illustrated in the accompanying drawings, in which.

DETAILED DESCRIPTION OF THE DRAWINGS

Figure 3:
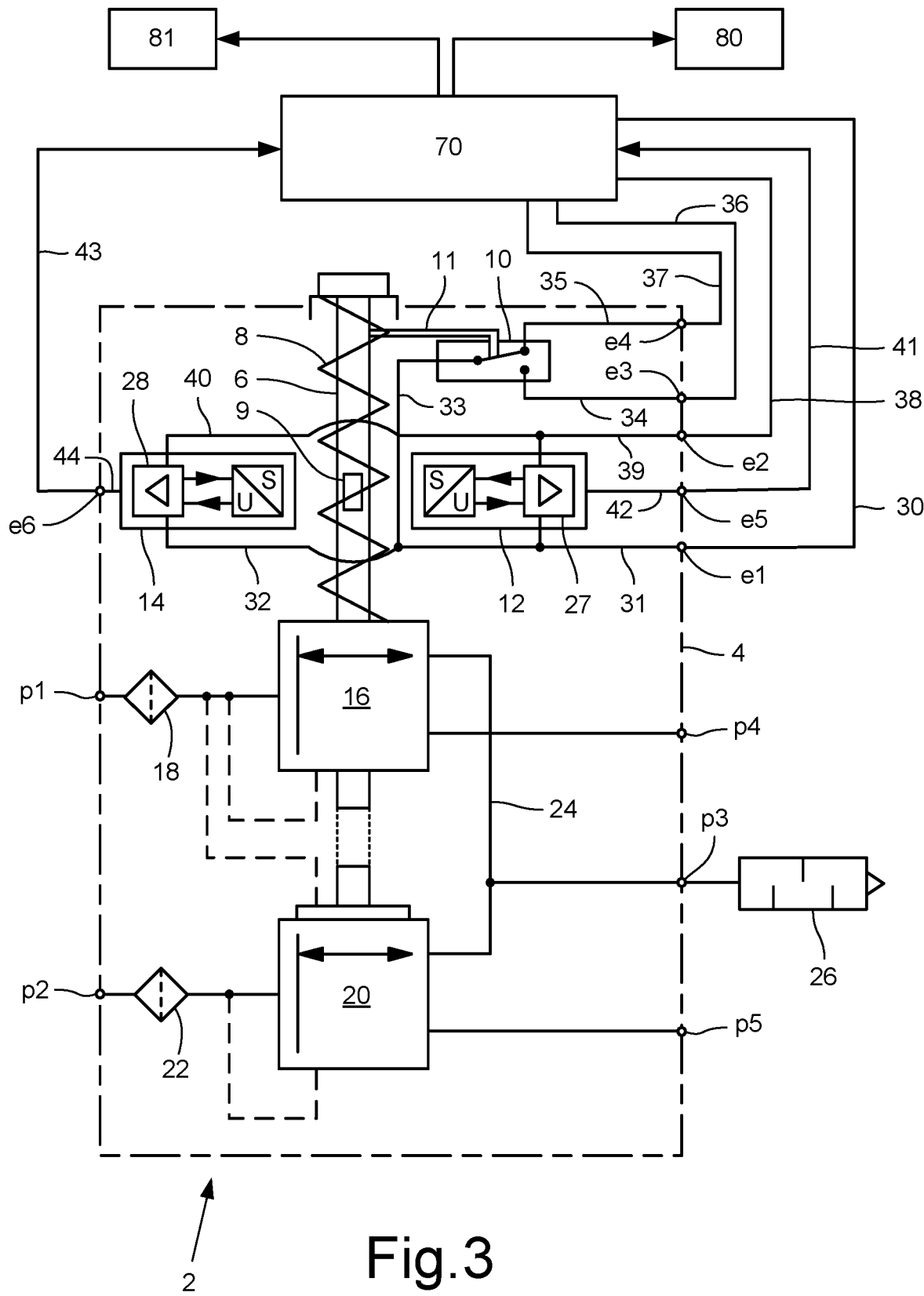
FIG. 3 shows a known foot brake module in a schematic view.

A prior foot brake module 2 of an electropneumatic brake system for a vehicle having at least two pneumatic brake circuits, known from WABCO printed document No. 815 020 208 3 mentioned at the outset, which can be activated by a brake pedal, is shown in a schematic view in FIG. 3. The foot brake module 2 has a pneumatic part having two pneumatic brake control valves 16, 20 and an electrical part having an electrical switch 10 and two electronic travel sensors 12, 14, which are arranged in a common housing 4. The two brake control valves 16, 20 can be activated by a brake pedal (not shown) via a plunger 6, in opposition to the restoring force of a pressure spring 8 designed as a coil spring.

The first brake control valve 16 has, on the input side, a pneumatic connection p1, provided with a first filter element 18, for a supply pressure line of the first brake circuit and, on the output side, a pneumatic connection p4 for a brake control line of the first brake circuit. Moreover, a vent line 24 connected to the first brake control valve 16 on the output side leads to a pneumatic vent output p3, which is connected to the environment via a muffler 26. The second brake control valve 20 has, on the input side, a pneumatic connection p2, provided with a second filter element 22, for a supply pressure line of the second brake circuit and, on the output side, a pneumatic connection p5 for a brake control line of the second brake circuit. Moreover, vent line 24 is also connected to the second brake control valve 20 on the output side and leads to the pneumatic vent output p3.

With increasing low pressures of the brake pedal, which result in a displacement of the plunger 6 in the direction of the two brake control valves 16, 20 (downwards in FIG. 3), an increasingly high brake control pressure is established at the output-side pneumatic connections p4, p5 by the two brake control valves 16, 20. In the case of the pneumatic control of the brake pressures in a respective pneumatic relay valve 80, 81 of the two brake circuits, these brake control pressures are converted into the brake pressure which is operative in the wheel brake cylinders of the respective brake circuit. For better clarity, the line connections from the two output-side pneumatic connections p4, p5 of the foot brake module 2 to the respectively associated relay valves 80, 81 are not illustrated separately, but are known to a person skilled in the art.

Accordingly, upon releasing the brake pedal, which results in a displacement of the plunger 6 away from the brake control valves 16, 20 (upwards in FIG. 3), the brake control pressures at the output-side pneumatic connections p4, p5 are reduced again in the case of a pneumatic control, which, in the associated relay valves 80, 81 of the two brake circuits, leads to lower operative brake pressures in the associated wheel brake cylinders.

The foot brake module 2 has a plurality of electrical connections e1 to e6, to which external electrical lines 30, 36, 37, 38, 41, 43 are connected. These external electrical lines 30, 36, 37, 38, 41, 43 are connected to a common control unit 70, which in turn serves to supply power to all electrical components of the foot brake valve 2 and, on the other hand, is also responsible for receiving and evaluating switching signals and sensor signals of the foot brake module 2. Using the received information, the common control unit 70 ultimately serves for electrically controlling the two relay valves 80, 81, which establish the required brake pressures at the wheel brake cylinders (not illustrated) of the vehicle.

In this regard, the known foot brake module 2 illustrated in FIG. 3 has a first electrical input connection e1 for supplying voltage to two travel sensors 12, 14, and an electrical switch 10. A first external voltage supply line 30, to which a sufficiently high electrical voltage is applied by the common control unit 70, is connected to this first electrical input connection e1. This supplied electrical voltage is supplied via a first internal line branch 31 of evaluation electronics 27 of the first travel sensor 12 and via a second internal line branch 32 of an evaluation electronics 28 of the second travel sensor 14. Moreover, a third internal line branch 33 of the voltage supply leads from the first internal line branch 31 to the aforementioned switch 10. The electrical switch 10 in the case of this known foot brake module 2 is electromechanically operative and is activated by a cam 11 (illustrated merely schematically) arranged on the plunger 6.

Moreover, a second electrical input connection e2 for the electrical ground potential (GND), to which a second external voltage supply line 38 is connected, is present in the known foot brake module 2. This second external voltage supply line 38 is connected to the common control unit 70, which applies the electrical ground potential thereto. Within the foot brake module 2, a first internal voltage supply line 39 for the ground potential and a second internal voltage supply line 40 for the ground potential are connected to the second electrical input connection e2 for the electrical ground potential, which supply lines connect the evaluation electronics 27, 28 of the two travel sensors 12, 14 to the ground potential.

The evaluation electronics 27 of the first travel sensor 12 are connected to an output connection e5 for the first travel sensor 12 in the foot brake module 2 via an internal first travel signal line 42, and the evaluation electronics 28 of the second travel sensor 14 are in communication with an output connection e6 for the second travel sensor 12 in the foot brake module 2 via an internal second travel signal line 44. A first external travel signal line 41 and second external travel signal line 43 are respectively connected to these two output connections e5, e6. The sensor signals of the two travel sensors 12, 14 are sent to the common control unit 70 via these two external travel signal lines 41, 43.

The switch 10 of the foot brake module 2 has two contact points to which an electrical voltage can be applied, which contact points are respectively connected to a first switch output connection e3 via a first internal switching signal line 34, and to a second switch output connection e4 via a second internal switching signal line 35, in the foot brake module 2. A first external switch signal line 36 for the switching signal and a second external switch signal line 37 for the switching signal of the switch 10 are respectively connected to these two switch output connections e3, e4.

As shown in the illustrated circuit diagram of the foot brake module 2, an electrical voltage is applied at one of the two switch output connections e3, e4 depending on the axial position of the plunger 6. The common control unit 70 is thus provided with information relating to whether or not a person is activating the foot brake module 2 by means of the plunger 6. Upon an activation of the brake pedal and the plunger 6, after overcoming an idle travel, the switch 10 is therefore brought into its second closed position. The initiation of a braking process is thus identified in the common control unit 70 and, if the on-board power supply is switched off or the ignition of the motor vehicle is switched off, the electronic control of the brake pressures is enabled. The common control unit 70 is thus woken up, so to speak. The actuating position of the plunger 6 upon the activation of the switch 10 is furthermore also used as a reference position for the electronic travel sensors 12, 14.

The electronic travel sensors 12, 14 serve as brake value generators and can be associated with the two brake circuits or a different brake circuit of the two brake circuits in each case. In the case of this known foot brake module 2, the two travel sensors 12, 14 are designed as AMR sensors (AMR effect=anisotropic magnetoresistance effect), which are operative in a contactless manner, and measure the brake actuating travel of the plunger 6. A permanent magnet 9, which is fastened to the plunger 6, serves as a signal generator for the two travel sensors 12, 14. The raw signal of the travel sensors 12, 14 is, in each case, converted into a pulse width modulated signal in the evaluation electronics 27, 28 arranged on a printed circuit board, which signal is transmitted to the common control unit 70 of an electronic brake control device via the output connections e5, e6. Corresponding control currents are then introduced into the aforementioned associated electromagnetic relay valves 80, 81 of the respective brake circuits by the common control unit 70, and are converted into a brake pressure which is operative in the associated wheel brake cylinders.

In normal operation, the control of the brake pressures takes place electronically and is only switched to the pneumatic control if a fault occurs in the electronic brake control device. The disadvantages of this known foot brake module 2 are the electromechanical design of the switch 10, which is subject to mechanical wear, the common power supply of the travel sensors 12, 14, which leads to the failure of both travel sensors 12, 14 in the event of a fault in the control electronics, and the presence of the two brake control valves 16, 20 despite these not being used during normal operation.

In contrast, in the case of the embodiments (depicted in FIGS. 1 and 2) of foot brake modules 2.1, 2.2 having features of the present disclosure, it is provided that the electrical switch 10' therein is operative in a contactless manner in each case. Moreover, the foot brake module 2.1 according to FIG. 1 has two travel sensors 12', 14', which are supplied with electrical voltage and ground potential independently of one another by a respectively associated separate control unit 71, 72, and the sensor measurement values thereof are received and evaluated separately in each case by these two control units 71, 72. However, the two control units 71, 72, amongst other things, share the respectively determined travel measurement values with one another via a communication line 53, possibly calculate arithmetic mean values therefrom, and use these mean values to generate current flows for the relay valves 80, 81 connected to the two control units 71, 72 in each case for the purpose of establishing brake pressures in the brake circuits of a vehicle. To this end, in this exemplary embodiment, the two control units 71, 72 are connected to the two relay valves 80, 81 in each case via control lines 84, 85; 86, 87.

Figure 1:
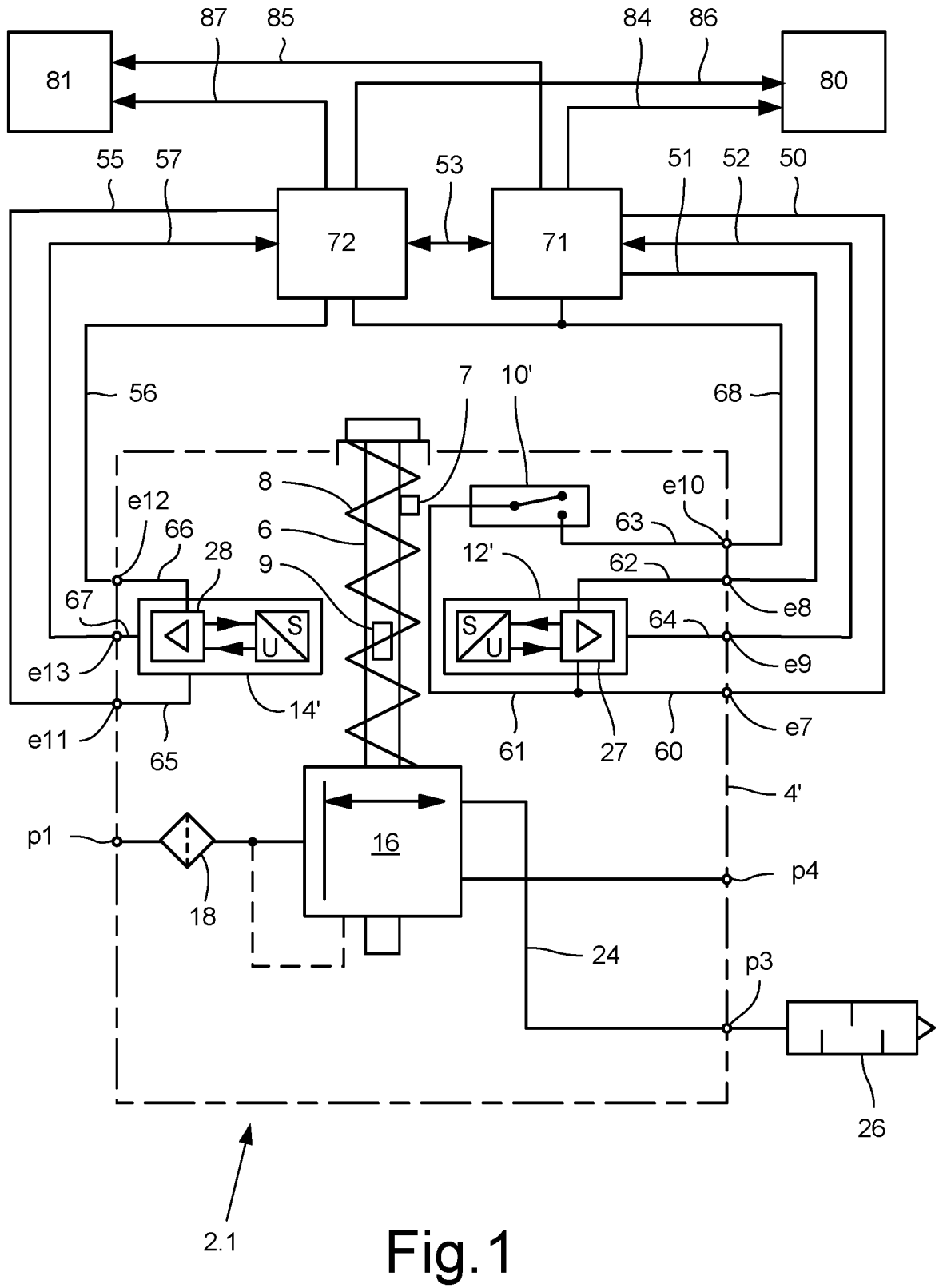
FIG. 1 shows a first embodiment of an inventive foot brake module in a schematic view.

The inventive foot brake module 2.1 illustrated in FIG. 1 has a first input connection e7 for an electrical voltage, which is provided by the first control unit 71 via a first external voltage supply line 50. From the first input connection e7, this electrical voltage arrives at the evaluation electronics 27 of the first travel sensor 12' via a first internal voltage line branch 60 and at the switch 10' via a second internal voltage line branch 61.

To supply the first travel sensor 12' with the electrical ground potential, an input connection e8 for the electrical ground potential is present in the foot brake module 2.1, to which input connection e8 the evaluation electronics 27 are connected via a first internal ground potential line 62. The electrical ground potential is provided via a second external voltage supply line 51 connected to the input connection e8, which voltage supply line 51 is connected to the first control unit 71.

Moreover, the first travel sensor 12' is connected to a first output connection e9 in the foot brake module 2.1 via a first internal travel signal line 64, to which output connection e9 a first external travel signal line 52 is also connected, which is connected to the first control unit 71.

In contrast to the known foot brake module according to FIG. 3, the foot brake module 2.1 according to FIG. 1 has a second input connection e11 for an electrical voltage, which is provided by the second control unit 72 via a second external voltage supply line 55. From the input connection e11, this electrical voltage arrives at the evaluation electronics 28 of the second travel sensor 14' via a third internal voltage line branch 65.

To supply the second travel sensor 14' with ground potential, a second input connection e12 for the electrical ground potential is present in the foot brake module 2.1, to which input connection e12 the evaluation electronics 28 of the second travel sensor 14' are connected via a third internal ground potential line 66. The electrical ground potential is provided via a fourth external voltage supply line 56 connected to the input connection e12, which voltage supply line 56 is connected to the second control unit 71.

Moreover, the second travel sensor 14' is connected to a second output connection e13 in the foot brake module 2.1 via a second internal travel signal line 67, to which output connection e13 a second external travel signal line 57 is also connected, which is connected to the second control unit 71. An autonomous electronic control is thus provided for each of the two brake circuits of a vehicle, whereby the likelihood of a failure of the electronic control for both brake circuits is significantly reduced.

The switch 10' of the foot brake module 2.1 according to FIG. 1 is connected by its output contact to an output connection e10 for the switch 10' via an internal switching signal line 63. The switch signal output via output connection e10 is provided to the first control unit 71 and the second control unit 72 via an external switch signal line 68 connected to the output connection e10. Owing to the communication line 53 present between the two control units 71, 72, the external switch signal line 68 can, however, also be routed to only one of the two control units 71, 72.

The switch 10' of the inventive foot brake module 2.1 according to FIG. 1 is operative in a magnetic-field-sensitive manner and can be designed either as a reed switch or as a Hall sensor with which a first permanent magnet 7 fastened to the plunger 6 is associated as a signal generator.

In the case of the foot brake module 2.1 according to FIG. 1, the two electronic travel sensors 12' 14' and only the first pneumatic brake control valve 16 are present in addition to the electrical switch 10'. The two travel sensors 12', 14' are associated with both brake circuits and operate redundantly with respect to one another. Therefore, should one of these travel sensors 12', 14' fail or deliver an implausible sensor signal, the brake system of the vehicle can still be controlled without difficulty.

The single brake control valve 16 is associated with the first brake circuit, although it can also be associated with both brake circuits of a vehicle.

Moreover, the control of the one brake circuit can be switched to the pneumatic control via the brake control valve 16 present, provided the brake control valve 16 is associated with the brake circuit having the electronic control which has failed. Alternatively, the affected vehicle can still be reliably braked via the other brake circuit and its electronic control.

In the event of a failure of the electronic control units 71, 72 of both brake circuits, the pneumatic control of the first brake circuit is enabled so that the affected vehicle can still be reliably braked via this brake circuit and its pneumatic control via the brake control valve 16 present. Omitting the second pneumatic brake control valve 20 provided in the prior art saves on material and manufacturing costs and the dimensions of the foot brake module 2.1 are reduced owing to the reduced overall height of the housing 4'.

Figure 2:
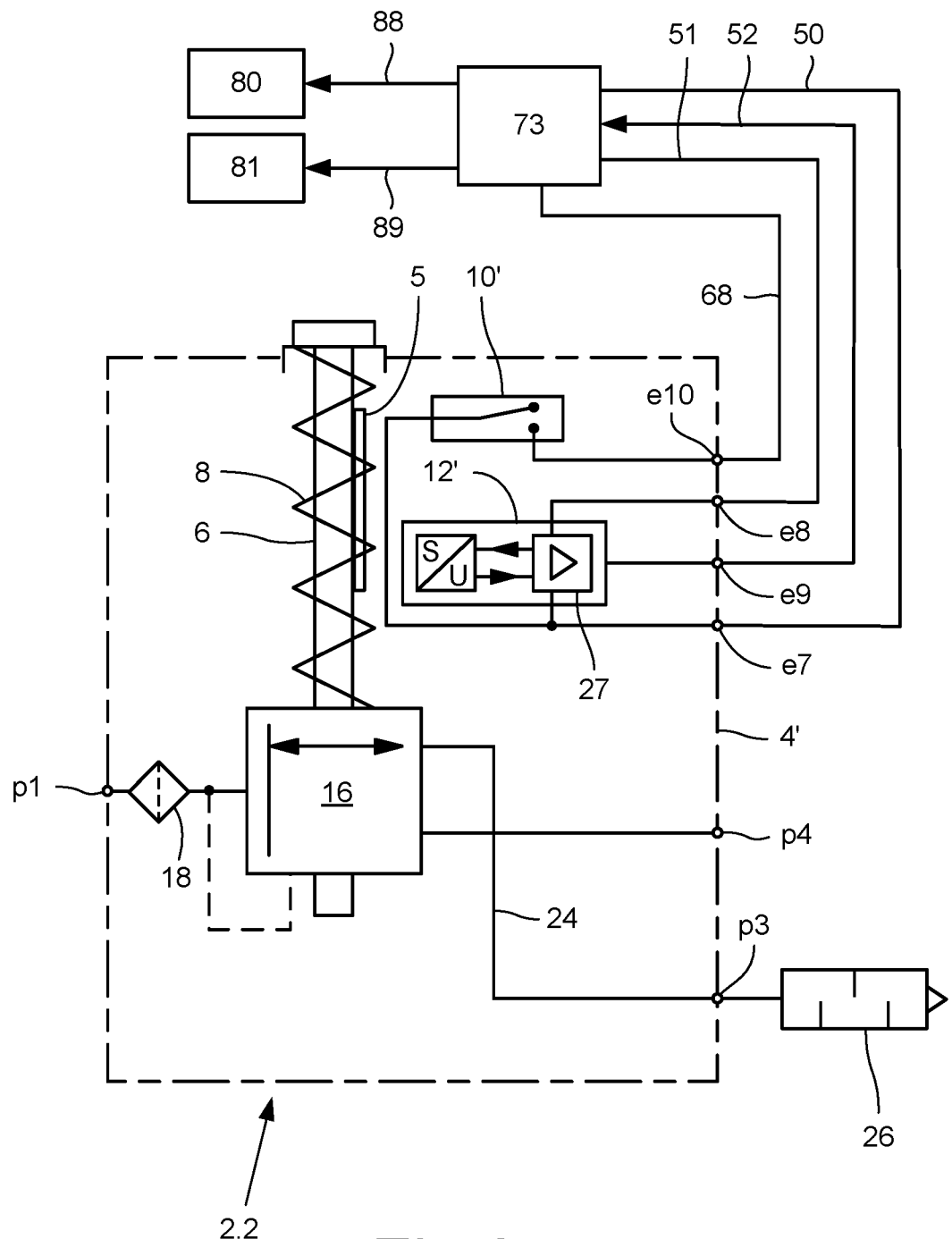
FIG. 2 shows a second embodiment of an inventive foot brake module in a schematic view.

In the foot brake module 2.2. according to FIG. 2, only the first electronic travel sensor 12' and the first pneumatic brake control valve 16 are present in addition to the electrical switch 10'. This foot brake module 2.2 is in communication with only a single control unit 73 via the electrical lines 50, 51, 52, 68 explained above, and this third control unit 73 is connected to associated relay valves 80, 81 of two brake circuits via control lines 88, 89 in order to supply the control currents needed to establish brake pressures.

The single travel sensor 12' is associated with both brake circuits of a vehicle and the brake control valve 16 is associated with the first brake circuit. In the event of a failure of the electronic control of both brake circuits, the pneumatic control of the first brake circuit is enabled so that the affected vehicle can still be reliably braked via this brake circuit and its pneumatic control via the brake control valve 16 present. Omitting the second electronic travel sensor 14' and the second pneumatic brake control valve 20 saves on material and manufacturing costs and the dimensions of the foot brake module 2.2 are reduced owing to the reduced overall height of the housing 4'.

In the case of the foot brake module 2.2 according to FIG. 2, it is moreover provided that both the electrical switch 10' and the single travel sensor 12' are activated in a contactless manner by only a single magnet 5, which is fastened to the plunger 6. The manufacturing costs of the foot brake module 2.2 can thus be further reduced.

While the above description constitutes the preferred embodiments of the present invention, it will be appreciated that the invention is susceptible to modification, variation and change without departing from the proper scope and fair meaning of the accompanying claims.

What is claimed is:

1. A foot brake module (2.1, 2.2) of an electropneumatic brake system of a motor vehicle, wherein the motor vehicle comprises at least two pneumatic brake circuits, wherein the brake module is activated by a brake pedal and has a pneumatic part having a single pneumatic brake control valve (16) and an electrical part having at least one electrical switch (10') and at least one electronic travel sensor (12', 14'), wherein the electrical switch (10') is operative in a contactless manner and wherein each of the at least one electronic travel sensor has a separate power supply and is connected to a respective electronic control unit (71, 72);
wherein the switch (10') and the at least one travel sensor (12', 14') are activated by a single, common permanent magnet (5) that is fastened to a plunger (6) that is in actuating communication with the brake pedal.

2. The foot brake module as claimed in claim 1, wherein the switch (10') is operative in a magnetic-field-sensitive manner.

3. The foot brake module as claimed in claim 2, wherein the switch (10') is a reed switch and the magnet is in actuating communication with the brake pedal, and the magnet is associated with the reed switch as a signal generator.

4. The foot brake module as claimed in claim 2, wherein the switch (10') is a Hall sensor and the magnet is in actuating communication with the brake pedal, and the magnet is associated with the Hall sensor as a signal generator.

5. The foot brake module as claimed in claim 1, wherein the single, common permanent magnet (5) is fastened to the plunger (6) outside of the at least one brake control valve.

6. The foot brake module as claimed in claim 1, wherein the at least one electronic travel sensor is a single electronic travel sensor, and apart from the electrical switch (10'), only the single electronic travel sensor (12') and only the single pneumatic brake control valve (16) are present, and wherein sensor signals of the single travel sensor (12'), after evaluation thereof, are used in the associated control unit (73) to control at least one pneumatic brake circuit.

7. The foot brake module as claimed in claim 1, wherein the at least one electronic travel sensor is a single electronic travel sensor.

8. The foot brake module as claimed in claim 1, wherein the at least one travel sensor is a single travel sensor, the at least one control unit is a single control unit associated with two brake circuits, and the single pneumatic brake control valve is operable to control at least one of the two brake circuits in response to failure of electronic control of both brake circuits.

9. A foot brake module (2.1, 2.2) of an electropneumatic brake system of a motor vehicle, wherein the motor vehicle comprises at least two pneumatic brake circuits, wherein the foot brake module is activated by a brake pedal and has a pneumatic part having a pneumatic brake control valve (16) and an electrical part having at least one electrical switch (10') and at least one electronic travel sensor (12', 14'), wherein the electrical switch (10') is operative in a contactless manner and wherein each of the at least one electronic travel sensor has a separate power supply and is connected to a respective electronic control unit (71, 72);
wherein a first permanent magnet is fastened to a plunger (6) that is in actuating communication with the brake pedal, wherein the first permanent magnet is associated with the switch as a first signal generator, wherein the at least one travel sensor (12', 14') is a Hall sensor, and a second permanent magnet (9) is fastened to the plunger (6), and the second permanent magnet is associated with the Hall sensor as a second signal generator.

10. The foot brake module as claimed in claim 9, wherein associated evaluation electronics (27, 28), in which the measured value can be converted into a digital data transfer signal, are arranged on a sensor chip of the at least one travel sensor (12, 14').

* * * * *